United States Patent [19]
Miyazaki

[11] Patent Number: 6,078,795
[45] Date of Patent: Jun. 20, 2000

[54] RADIO RECEIVER CAPABLE OF DETECTING A CORRECT ELECTRIC FIELD STRENGTH OF A RECEIVED RADIO SIGNAL OF A PARTICULAR FREQUENCY

[75] Inventor: Shinichi Miyazaki, Tokyo, Japan

[73] Assignee: NEC Corporation, Tokyo, Japan

[21] Appl. No.: 08/320,385

[22] Filed: Oct. 11, 1994

Related U.S. Application Data

[63] Continuation of application No. 07/838,338, Feb. 20, 1999, abandoned.

[30] Foreign Application Priority Data

Feb. 20, 1991 [JP] Japan ..................................... 3-047770

[51] Int. Cl.[7] .................................................. H04B 17/00
[52] U.S. Cl. ..................................... 455/226.2; 455/226.4
[58] Field of Search .............................. 455/164.2, 182.3, 455/186.1, 192.2, 257, 258, 226.1, 226.2, 226.3, 226.4, 316, 67.1

[56] References Cited

U.S. PATENT DOCUMENTS

| | | | |
|---|---|---|---|
| 5,152,009 | 9/1992 | Sato ...................................... | 455/226.1 |
| 5,335,362 | 8/1994 | Vaisanen et al. ..................... | 455/226.1 |

FOREIGN PATENT DOCUMENTS

| | | |
|---|---|---|
| 4-097626 | 3/1992 | Japan . |
| 2155712 | 9/1985 | United Kingdom . |

OTHER PUBLICATIONS

Patent Abstracts of Japan, vol. 15, No. 58 (E–1032), Feb. 12, 1991, JPA 2–285817 Abstract, NEC Corporation, Shinichi Miyazaki.

*Primary Examiner*—Thanh Cong Le
*Attorney, Agent, or Firm*—Sughrue, Mion, Zinn, Macpeak & Seas, PLLC

[57] ABSTRACT

In a radio receiver for receiving a particular radio signal of a particular frequency with an electric field strength among a plurality of radio signals of different frequencies, a temperature detector produces a detected temperature signal representative of an ambient temperature of the radio receiver. A correcting signal producing unit produces a correcting signal representative of a control value determined by the detected temperature signal and a particular control signal produced by a frequency controller to indicate a local frequency for the particular frequency. A correcting unit corrects, according to the correcting signal, an electric field strength signal which is produced by an electric field strength detector to represent the electric field strength detected in a detected signal produced by a detector by detecting the particular radio signal in response to the particular control signal.

5 Claims, 4 Drawing Sheets

RADIO RECEIVER CAPABLE OF DETECTING A CORRECT ELECTRIC FIELD STRENGTH OF A RECEIVED RADIO SIGNAL OF A PARTICULAR FREQUENCY

This is a Continuation of application Ser. No. 07/838,338 filed Feb. 20, 1992, now abandoned.

BACKGROUND OF THE INVENTION

This invention relates to a radio receiver for receiving a particular radio signal of a particular frequency with an electric field strength among a plurality of radio signals of different frequencies.

A conventional radio receiver includes a frequency controller for producing a particular control signal indicative of a local frequency. A detector detects the particular radio signal in response to the particular control signal to produce a detected signal. An electric field strength detector is supplied with the detected signal. The electric field strength detector detects the electric field strength to produce an electric field strength signal representative of the electric field strength.

As will later be described more in detail, the conventional radio receiver is deficient in that the electric field strength detector can not correctly detect the electric field strength. This is because the detector is frequency and temperature sensitive and produces the detected signal with gains in accordance with the particular frequency and an ambient temperature of the radio receiver.

SUMMARY OF THE INVENTION

It is therefore an object of the present invention to provide a radio receiver capable of correctly detecting the electric field strength of a received radio signal of a particular frequency.

One aspect of this invention pertains to a radio receiver for receiving a particular radio signal of a particular frequency with an electric field strength among a plurality of radio signals of different frequencies and includes: (A) a frequency controller for producing a particular control signal indicative of local frequency; (B) a detector for detecting the particular radio signal in response to the control signal to produce a detected signal; and (C) an electric field strength detector supplied with the detected signal for detecting the electric field strength to produce an electric field strength signal representative of the electric field strength.

According to the above-described aspect of this invention, the above-understood radio receiver comprises: (A) temperature detecting means for detecting an ambient temperature of the radio receiver to produce a detected temperature signal representative of the ambient temperature, (B) correcting signal producing means connected to the frequency controller and to the temperature detecting means for producing a correcting signal representative of a control value determined by the particular control signal and the detected temperature signal, and (C) correcting means connected to the electric strength detector and to the corrected signal producing means for correcting the electric field strength signal according to the correcting signal.

Another aspect of this invention is to present a method for receiving a particular radio signal of a particular frequency with an electric field strength among a plurality of radio signals of different frequencies and includes the steps of: producing a particular control signal indicative of a local frequency, detecting said particular radio signal in response to said particular control signal to produce a detected signal, and detecting said electric field strength in said detected signal to produce an electric field strength signal representative of said electric field strength.

According to the different aspect of this invention, the above-understood method comprises the steps of (A) detecting an ambient temperature of said radio receiver to produce a detected temperature signal representative of said ambient temperature; (B) producing a correcting signal representative of a control value determined by said particular control signal and said detected temperature signal; and (C) correcting said electric field strength signal according to said correcting signal.

DESCRIPTION OF THE PREFERRED EMBODIMENT

Figure 1:
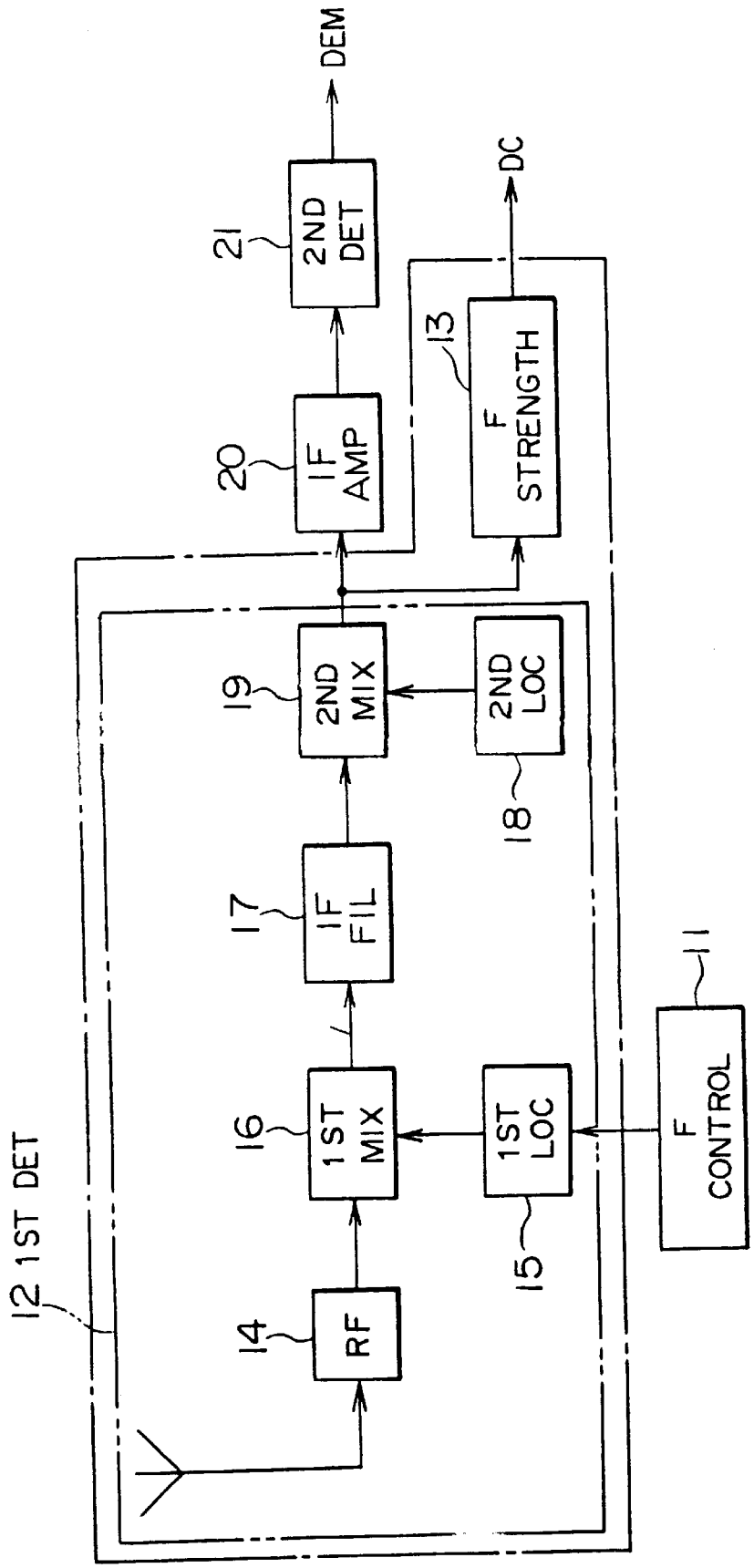
FIG. 1 is a block diagram of a conventional radio receiver.

Referring to FIG. 1, a conventional radio receiver will first be described in order to facilitate an understanding of the present invention.

The radio receiver is for receiving a particular radio signal of a particular frequency with a specific electric field strength among a plurality of radio signals having different frequencies and received with field strengths which may be different from the specific electric field strength.

In FIG. 1, the radio receiver is a double superheterodyne receiver for use typically as an ordinary radio receiver, a mobile telephone set, and an MCA (multi channel access) radio receiver. The illustrated radio receiver includes a frequency controller (F CONTROL) 11 for producing a particular control signal indicative of a local frequency for use in double superheterodyne. A first detector (DET) 12 is for detecting the particular radio signal in response to the particular control signal to produce a detected signal in the manner which will presently be described in detail. An electric field strength detector (F STRENGTH) 13 is supplied with the detected signal for detecting the electric field strength to produce an electric field strength signal DC having an amplitude representative of the electric field strength. Generally, the electric field strength detector detects the amplitude of the detected signal and produces a direct voltage signal as the electric field strength signal.

The first detector 12 comprises an RF (radio frequency) amplifier 14 connected to an antenna for amplifying the radio signals of the plurality in number, which signals are received at the antenna as received radio signals. A first local oscillator (LOC) 15 is connected to the frequency controller 11 for producing a first local signal in accordance with the particular control signal. A first mixer (MIX) 16 is connected to the RF amplifier 14 and to the first local oscillator 15 for producing a first IF (intermediate frequency) signal. An IF filter 17 is connected to the first mixer 16 for filtering the first IF signal. A second local oscillator 18 is for producing a second local signal. A second mixer 19 is connected to the IF filter 17 and to the second local oscillator 18 for producing a second IF signal. An IF amplifier 20 is connected to the second mixer 19 for amplifying the detected signal into an amplified detected signal. A second detector 21 is connected to the IF amplifier 20 for detecting and demodulating the amplified detected signal to produce a demodulated signal DEM as original intelligence, such as a sound signal or a data signal.

Figure 2A:
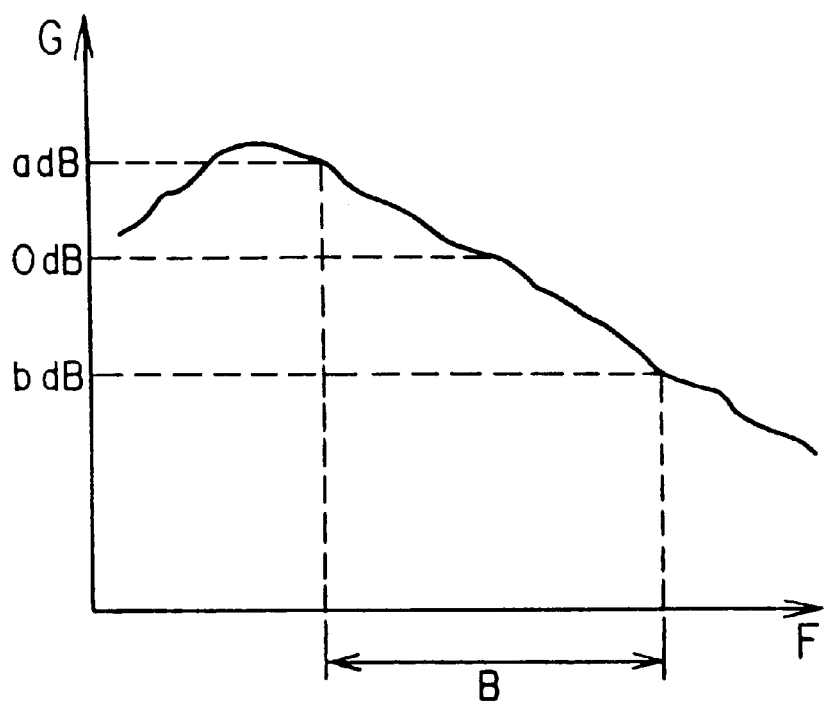
FIG. 2(A) is a graph illustrative of a frequency characteristic of a detector.
Figure 2B:
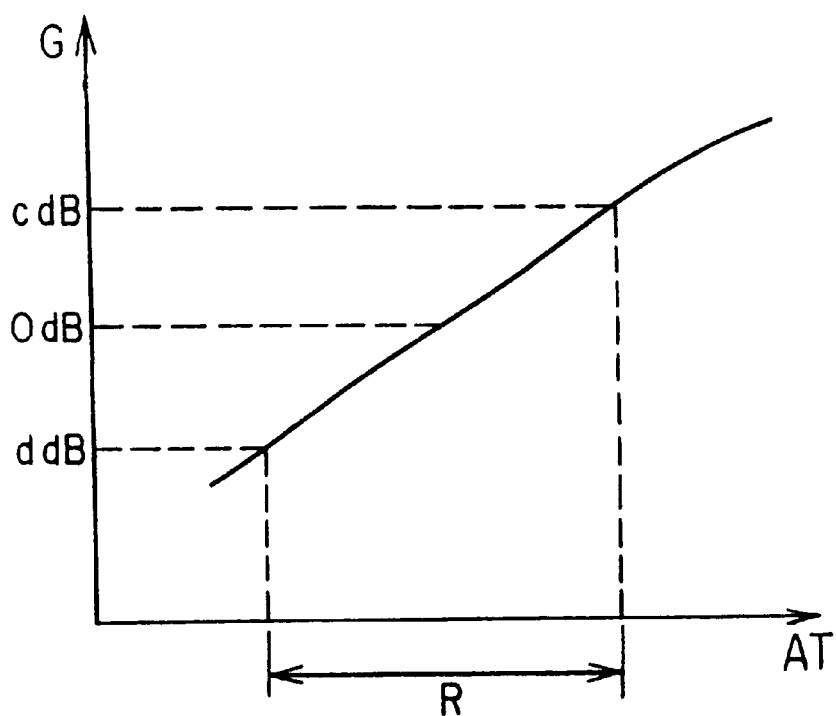
FIG. 2(B) is a graph which shows a temperature characteristic of the detector.

Referring to FIG. 2(A), the first detector 12 has a frequency characteristic depicted as a gain G versus a frequency F. It will be assumed that the first detector 12 is operable in a frequency band B. FIG. 2(B) shows a temperature characteristic again as a gain G versus ambient temperature AT of the radio receiver. The first detector 12 is operable in a temperature range R.

The detected signal has distortion corresponding to the particular frequency and the ambient temperature. The electric field strength detector 13 detects an electric field strength with the distortion. As a result, the conventional radio receiver is defective in that the electric field strength detector 13 can not correctly detect the electric field strength.

Figure 3:
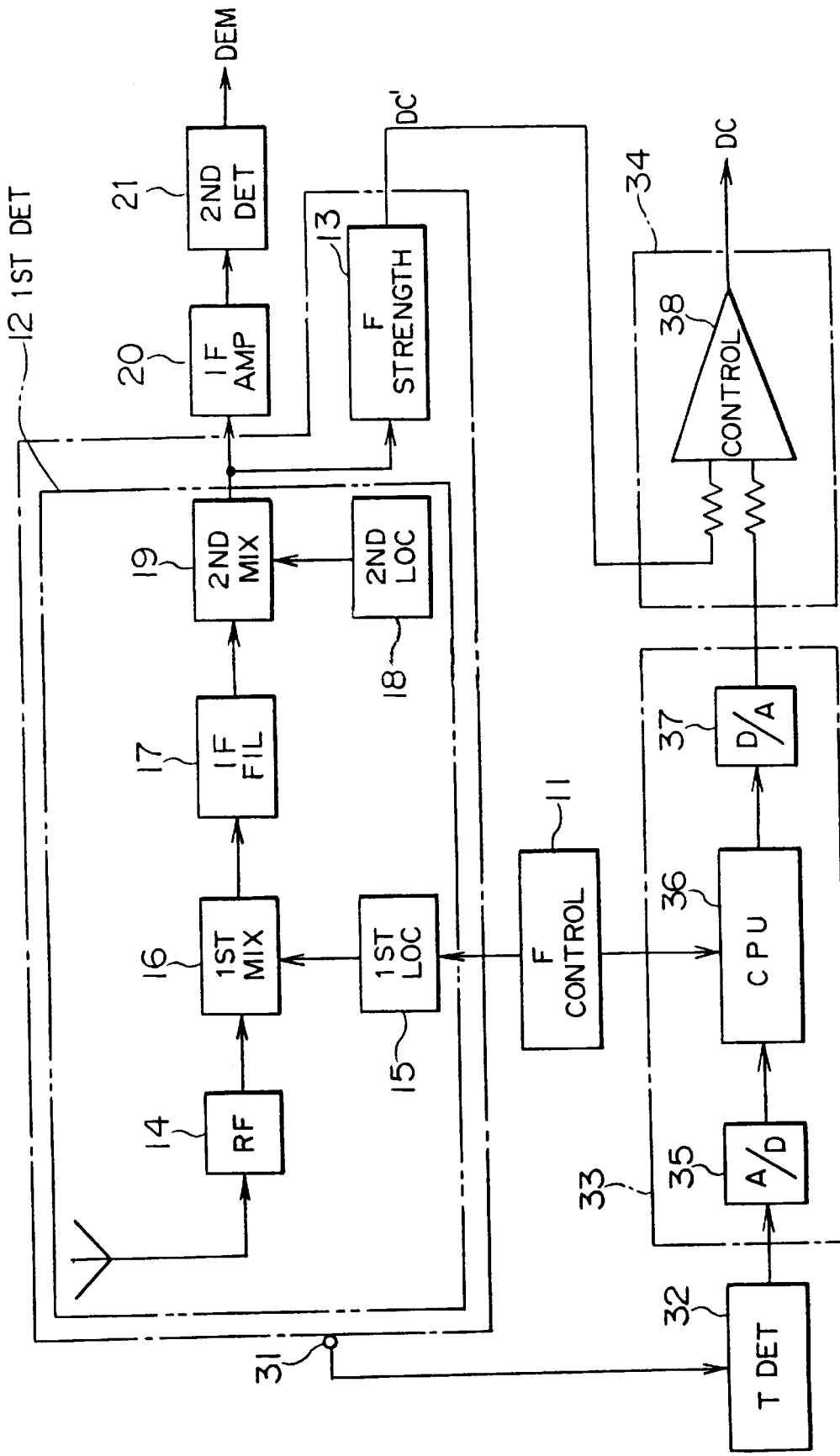
FIG. 3 is a block diagram of a radio receiver according to an embodiment of this invention.

Referring to FIG. 3, the description will proceed to a radio receiver according to a preferred embodiment of this invention.

This radio receiver is for receiving a particular radio signal of a particular frequency with an electric field strength among a plurality of radio signals of different frequencies. The illustrated radio receiver includes a frequency controller (F CONTROL) 11 for producing a particular control signal indicative of a local frequency for use in double superheterodyne. Like in FIG. 1, a first detector (DET) 12 is for detecting the particular radio signal in response to the particular control signal to produce a detected signal in the manner which will presently be described in detail. An electric field strength detector (F STRENGTH) 13 is supplied with the detected signal for detecting the electric field strength to produce an electric field strength signal DC' having amplitude representative of the electric field strength.

The first detector 12 comprises an RF amplifier 14 connected to an antenna for amplifying the radio signals of the plurality in number, which signals are received at the antenna as received radio signals. A first local oscillator (LOC) 15 is connected to the frequency controller 11 for producing a first local signal in accordance with the particular control signal. A first mixer (MIX) 16 is connected to the RF amplifier 14 and to the first local oscillator 15 for producing a first IF signal. An IF filter 17 is connected to the first mixer 16 for filtering the first IF signal. A second local oscillator 18 is for producing a second local signal. A second mixer 19 is connected to the IF filter 17 and to the second local oscillator 18 for producing a second IF signal as the detected signal. An IF amplifier 20 is connected to the second mixer 19 for amplifying the detected signal into an amplified detected signal. A second detector 21 is connected to the IF amplifier 20 for detecting and demodulating the amplified detected signal to produce a demodulated signal (DEM).

The radio receiver is put in operation in an ambient temperature and comprises a temperature sensor 31, depicted by a small circle, for detecting the ambient temperature of the radio receiver to produce a sensed temperature signal representative of the ambient temperature. A temperature detector (T DET) 32 is supplied with the sensed temperature signal to produce a detected temperature signal. A correcting signal producing unit 33 is connected to the frequency controller 11 and to the temperature detector 32 to produce a correcting signal representative of a control value determined by the particular control signal and the detected temperature signal. A correcting unit 34 is connected to the electric field strength detector 13 and to the correcting signal producing unit 33 for correcting the electric field strength signal DC' according to the correcting signal.

The correcting signal producing unit 33 comprises an A/D (analog-to-digital) converter 35 connected to the temperature detector 32 to convert the detected temperature signal into a digital temperature signal. A CPU (central processing unit) 36 is connected to the A/D converter 35 and to the frequency controller 11 to produce a digital correcting signal. A D/A (digital-to-analog) converter 37 is connected to the CPU 36 to convert the digital correcting signal to an analog correcting signal as the correcting signal.

As will become clear in the following discussion, the CPU comprises a first memory area for memorizing a plurality of frequency control values in correspondence to a plurality of control signals in accordance with a frequency characteristic in FIG. 2(A). A second memory area is for memorizing a plurality of temperature control values in correspondence to a plurality of temperature signals in accordance with a temperature characteristic in FIG. 2(B). A first memory reader is connected to the frequency controller and to the first memory area for reading out of the first memory area as a first read-out value one of the frequency control values that corresponds to the particular control signal. A second memory reader is connected to the temperature detector and to the second memory area for reading out of the second memory area as a second read-out value one of the temperature control values that corresponds to the detected temperature signal. An adder is connected to the first and second memory readers for producing, as the digital correcting signal, a sum signal representative of a sum of the first and the second read-out values.

In FIG. 3, the correcting unit 34 comprises an operational amplifier 38 for adding the correcting signal to the electric field strength signal to produce a corrected electric field strength signal DC.

Figure 4:
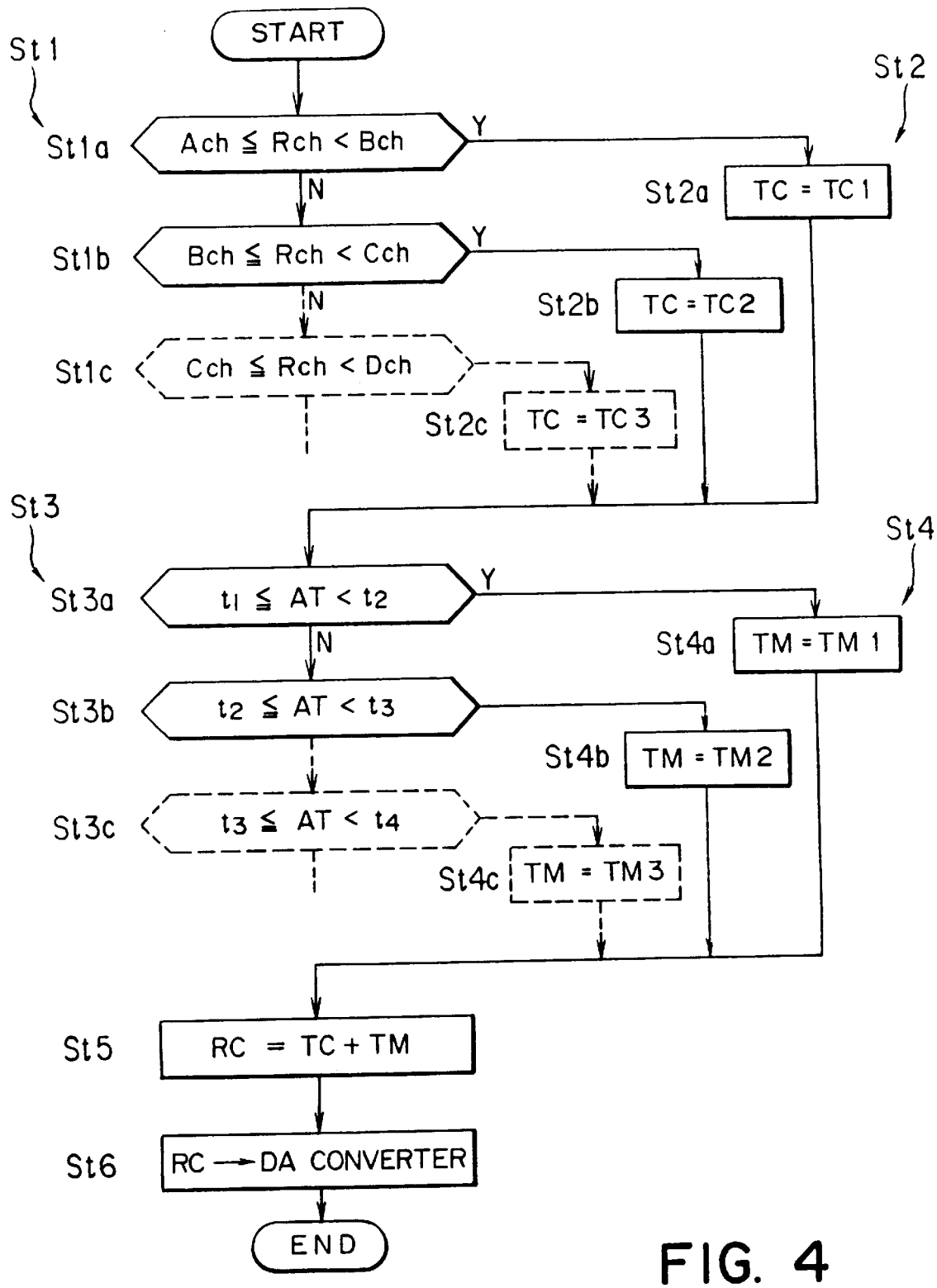
FIG. 4 is a flowchart for use in describing operation of the radio receiver illustrated in FIG. 3.

Referring to FIG. 4, operation of the CPU will be described. The CPU 36 is supplied with the particular control signal and the digital temperature signal. In a first step St1, the CPU 36 retrieves a received channel according to the particular control signal in the first memory area. In a step St1a, the CPU 36 judges whether the received channel is within the limits of a predetermined band. Similarly, in steps St1b and St1c the CPU 36 judges whether the received channel is within the limits of preselected ranges, respectively.

In a second step St2, the first memory reader reads out one of the frequency control values as a first read-out value TC from the first memory area in the CPU 36. It will be assumed that the different frequencies are first, second, third, and fourth frequencies $f_A$, $f_B$, $f_C$, and $f_D$ ($f_A < f_B < f_C < f_D$) and that the first through the fourth frequencies $f_A$, $f_B$, $f_C$, and $f_D$ are allocated to channels Ach, Bch, Cch, and Dch. If a received channel Rch is Ach≦Rch<Bch, the first read-out value TC is equal to TC1 in the manner depicted at a step St2a. If the received channel Rch is Bch≦Rch<Cch, the first read-out value TC is equal to TC2 in the manner illustrated at a step St2b. If the received channel Rch is Cch≦Rch<Dch, the first read-out value TC becomes equal to TC3 as illustrated at a step St2c.

In a third step St3, the CPU 36 retrieves the ambient temperature according to the digital temperature signal in the second memory area. In a step St3a, the CPU 36 judges whether the ambient temperature AT is within the limits of a predetermined temperature range. Similarly, in steps St3b and St3c the CPU 36 judges whether the received channel is within the limits of prescribed temperature ranges, respectively.

In a fourth step St4, the second memory reader reads out one of the temperature control value as a second read-out value TM. It will be presumed that typical temperatures are represented by t1, t2, t3, and t4 (t1<t2<t3<t4). If an ambient temperature AT is t1≦AT<t2, the second read-out value TM is equal to TM1 in the manner depicted at a step St4a. If the ambient temperature AT is t2≦AT<t3, the second read-out value TM is equal to TM2 in the manner illustrated at a step St4b. If the ambient temperature AT is t3≦AT<t4, the second read-out value TM becomes equal to TM3 as illustrated at a step St4c.

In a fifth step St5, the adder produces as the digital correcting signal, a sum signal representative of a sum RC of the first and the second read-out values TC and TM.

In a sixth step St6, the adder supplies the digital correcting signal to the D/A converter 37. The D/A converter 37 supplies the analog correcting signal as the correcting signal to the correcting unit 34. The correcting unit 34 corrects the electric field strength signal DC' according to the correcting signal and produces the corrected electric field strength signal DC.

What is claimed is:

1. A radio receiver for selectively receiving a radio signal of each frequency channel selected from a plurality of different frequency channels to detect an electric field strength of said radio signal and to produce an output signal representative of said electric field strength together with a demodulated signal obtained from said radio signal, said radio receiver comprising:

a frequency controller for producing a control signal indicative of each said frequency channel;

a detector for detecting said radio signal in response to said control signal to produce a detected signal;

a demodulator for demodulating said detected signal into said demodulated signal;

an electric field strength detector for receiving and detecting the electric field strength of said detected signal to produce an electric field strength signal representative of said electric field strength;

frequency monitoring means connected to said frequency controller for monitoring said control signal to detect the frequency channel indicated by said control signal and to produce a frequency correction signal determined for the frequency channel indicated by said control signal;

temperature detecting means for detecting an ambient temperature of said radio receiver, said ambient temperature falling into one of a plurality of temperature regions, to produce a detected temperature signal representative of said ambient temperature;

temperature monitoring means connected to said temperature detecting means for monitoring the detected temperature signal to detect each of the temperature regions represented by said detected temperature signal, and to produce a temperature correction signal for each of the temperature regions;

calculation means for calculating both said frequency correction signal and said temperature correction signal and generating a final correction signal which is calculated from both said frequency correction signal and said temperature correction signal and which is varied by a cross-correlation between said ambient temperature and said frequency channel;

correcting means supplied with said final correction signal and said electric field strength signal for correcting said electric field strength signal in accordance with said final correction signal, to produce said output signal corrected by said final correction signal in each of said frequency channels.

2. A radio receiver as claimed in claim 1, wherein said calculation means calculates a sum of said frequency and said temperature correction signals.

3. A radio receiver as claimed in claim 1, wherein said frequency monitoring means comprises:

a first memory area for memorizing a plurality of said frequency correction signals determined for each respective said frequency channel; and first readout means operable in cooperation with said first memory area for reading out said first memory area as a readout frequency correction signal to produce said readout frequency correction signal as said frequency correction signal.

4. A radio receiver as claimed in claim 3, wherein said temperature monitoring means comprises:

a second memory area for memorizing a plurality of said temperature correction signals determined for respective said ones of temperature regions; and a second readout means operable in cooperation with said second memory area for reading out of said second memory area a readout temperature correction signal as said temperature correction signal.

5. A method of selectively receiving a radio signal of each frequency channel selected from a plurality of different frequency channels to detect an electric field strength of the radio signal and to produce an output signal representative of said electric field strength together with a demodulated signal obtained from said radio signal, said method comprising steps of:

producing a control signal indicative of each said frequency channel;

detecting the radio signal in response to said control signal to produce a detected signal;

demodulating said detected signal into said demodulated signal;

detecting said electric field strength to produce an electric field strength signal representative of the electric field strength;

monitoring the control signal to detect the frequency channel indicated by the control signal and to produce a frequency correction signal determined for the frequency channel indicated by the control signal;

detecting an ambient temperature of said radio receiver, said ambient temperature falling into one of a plurality of temperature regions, to produce a detected temperature signal representative of said ambient temperature;

monitoring the detected temperature signal to detect each of the temperature regions represented by said ambient temperature, to produce a temperature correction signal for each of the temperature regions;

calculating a final correction signal from both said frequency correction signal and said temperature correction signal, wherein said final correction signal is varied by a cross-correlation between said ambient temperature and said frequency channel; and correcting the electric field strength signal in accordance with the final correction signal and producing the output signal corrected by the final correction signal for each of said frequency channels.

* * * * *

UNITED STATES PATENT AND TRADEMARK OFFICE
CERTIFICATE OF CORRECTION

PATENT NO. : 6,078,795
DATED : June 20, 2000
INVENTOR(S) : Shinichi MIYAZAKI

It is certified that error appears in the above-indentified patent and that said Letters Patent is hereby corrected as shown below:

In the Related U.S. Application Data delete "Feb. 20, 1999" and insert --Feb. 20, 1992"

Signed and Sealed this

Seventeenth Day of April, 2001

Attest:

NICHOLAS P. GODICI

*Attesting Officer*  *Acting Director of the United States Patent and Trademark Office*